United States Patent
Goers et al.

(10) Patent No.: US 6,750,566 B2
(45) Date of Patent: Jun. 15, 2004

(54) BUS ACCESS UNIT FOR A PLUGGABLE ELECTRICAL UNIT

(75) Inventors: Andreas Goers, Pattensen (DE); Helmut Michel, Hannover (DE); Reiner Bleil, Peine (DE)

(73) Assignee: ABB Patent GmbH, Mannheim (DE)

( * ) Notice: Subject to any disclaimer, the term of this patent is extended or adjusted under 35 U.S.C. 154(b) by 264 days.

(21) Appl. No.: 10/000,916

(22) Filed: Oct. 23, 2001

(65) Prior Publication Data

US 2002/0096942 A1 Jul. 25, 2002

(30) Foreign Application Priority Data

Oct. 24, 2000 (DE) .......................... 100 52 623

(51) Int. Cl.[7] .............................................. H01H 00/00
(52) U.S. Cl. ........................................ 307/134; 710/302
(58) Field of Search ............................ 307/134; 710/302

(56) References Cited

U.S. PATENT DOCUMENTS 5,822,547 A * 10/1998 Boesch et al. .............. 710/302
6,026,458 A * 2/2000 Rasums ....................... 710/302

* cited by examiner

Primary Examiner—Robert DeBeradinis
(74) Attorney, Agent, or Firm—Michael M. Rickin, Esq.

(57) ABSTRACT

A pluggable electrical unit with module electronics has a bus access unit for electrical connection of the pluggable unit to an electrical base unit. The base unit comprises a power supply, a signal processing means and signal lines for identification, control lines, address lines and data lines, which are connected in the manner of a bus to a plurality of contact devices. The bus access unit has a variable resistor and switches for isolation. The variable resistor and the switches for isolating signal lines for identification, control lines address lines and data lines in the pluggable electrical unit are linked to one another in a causal chain.

18 Claims, 1 Drawing Sheet

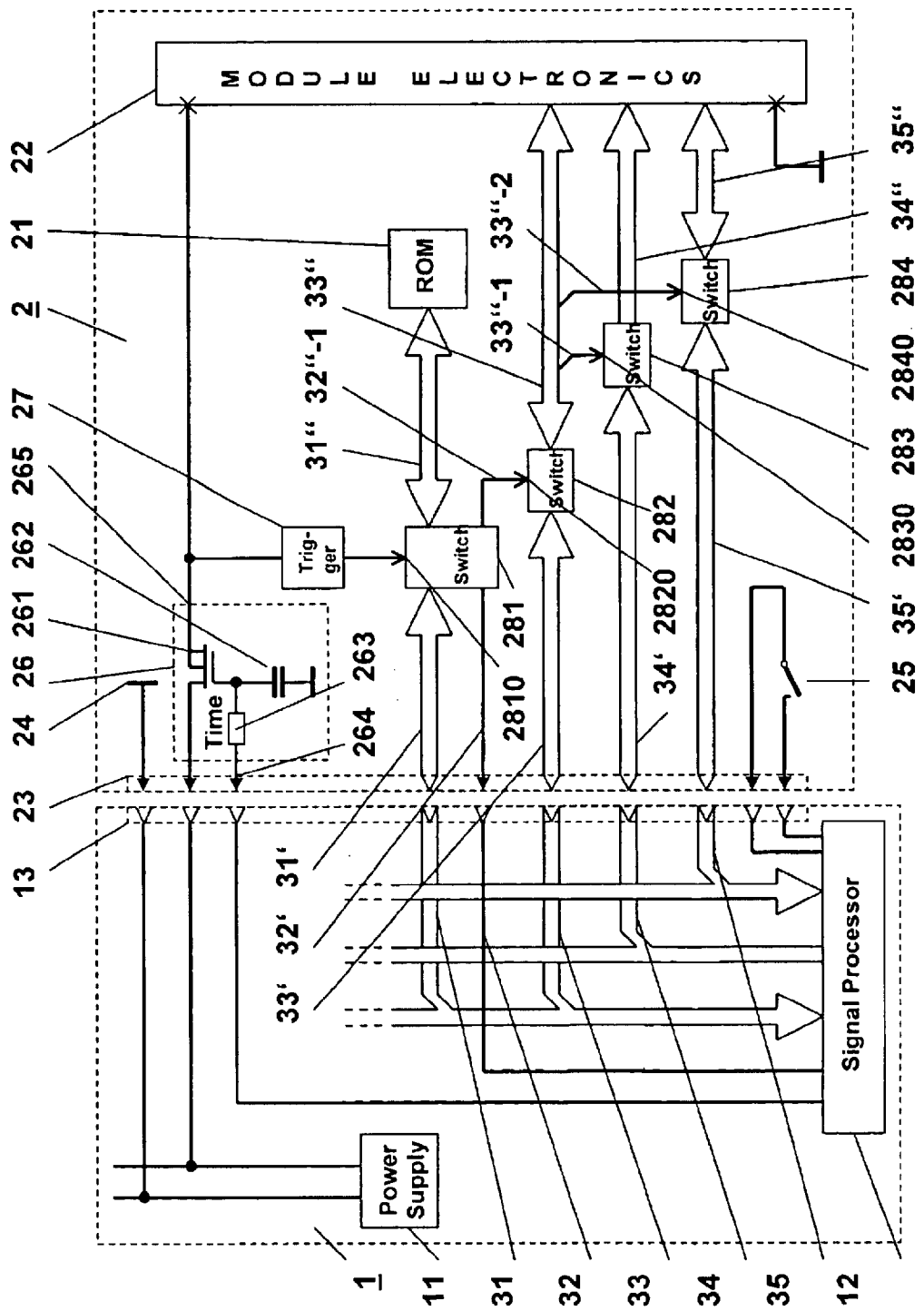
Figure

BUS ACCESS UNIT FOR A PLUGGABLE ELECTRICAL UNIT

FIELD OF THE INVENTION

The invention relates to a bus access unit for a pluggable electrical unit for the electrical connection of this pluggable electrical unit to an electrical base unit.

DESCRIPTION OF THE PRIOR ART

Complex electrical engineering systems, in particular in measuring and control technology and in telecommunications, are often of a modular construction. This involves a large number of electrical units being accommodated in an enclosure of an electrical base unit in a pluggable manner. The pluggable electrical units are mechanically of an identical construction but electrically different according to their intended function.

When a complex system of this type is expanded by adding further pluggable electrical units while operation is in progress or when one of the pluggable electrical units is exchanged, there is the risk of electrical components of the pluggable electrical unit and/or of the base unit being damaged or destroyed if an electrical unit which, though mechanically able to be inserted into the slot, is not electrically and functionally intended for this slot is inserted into the slot.

DE 196 10 556 discloses a bus access unit for connecting a subassembly of a programmable controller to a bus, which subassembly is spatially arranged in the base unit and is tested by means of a test contact and an evaluation circuit to ascertain that it is a plug-in module and, if it is a plug-in module, a variable resistor fitted into the feed line of the plug-in module is switched to low resistance after a predetermined waiting time.

Furthermore, EP 888 589 discloses a bus access unit for connecting a subassembly of a programmable controller to a bus, which subassembly is spatially arranged in the base unit and for which the bus lines of the control bus are connected via bidirectional inhibitable drivers to the terminals of the plug-in module which correspond to the bus lines. The bidirectional inhibitable drivers can be activated individually and in groups.

WO 97/07465 discloses a bus access unit with an adaptor plug, which for each slot is fitted between the base unit and the plug-in module, and has means for isolating the plug-in module from the base unit.

All the known bus access units have the common feature that the electrical interfaces of all the slots for receiving plug-in modules are uniform. Consequently, the electrical interfaces of electrically and functionally different plug-in modules have to be of an identical configuration.

Such uniform interfaces no longer allow individualizing of the electrical interface of the pluggable electrical units that is designed for the plug-in contact device, since plug-in contacts of the same name would be wired to different types of signals, which may also differ in the direction of signal transmission. If the free choice of slots is maintained for all the pluggable electrical units, the number of necessary plug-in contacts increases in proportion to the degree of individualization of the pluggable electrical units, and so does the complexity of the backplane wiring and of the bus access units. This additional complexity is felt to be disadvantageous. In addition, the overall size of the plug-in connector increases with the number of pins. Plug-in connectors of a larger overall size are at odds with the miniaturization of pluggable electrical units.

The invention is therefore based on the object of providing a bus access unit which is suitable for managing electrical interfaces of different types for electrically and functionally different plug-in modules while maintaining the free choice of slots in such a way that disruptions to units already in operation and damage to the unit to be inserted are avoided.

SUMMARY OF THE INVENTION

The invention is based on a bus access unit for a pluggable electrical unit for the electrical connection of this pluggable electrical unit to an electrical base unit, the base unit having a processing unit, and the bus access unit comprising a multipin plug-in contact device for the connection of the pluggable electrical unit to the base unit, a variable resistor, which is arranged in the feed line to the power supply of the pluggable electrical unit from the base unit, with a control input and with a high-resistance and a low-resistance state and means connected to the plug-in contact device for isolating control lines, data lines and address lines of the pluggable electrical unit from the base unit.

The essence of the invention is to arrange the variable resistor and the means for isolating control lines, data lines and address lines in the pluggable electrical unit and link them to one another in a causal chain.

It is specifically provided that the pluggable electrical unit has a first bus switch arrangement with a first control input for isolating a first group of control lines and for isolating signal lines for the identification of the pluggable electrical unit, the first control input of which is connected via a trigger circuit to the controlled terminal of the variable resistor.

The pluggable electrical unit additionally has a second bus switch arrangement with a second control input for isolating a second group of control lines, the second control input of which is connected to an isolated control line from the first group of control lines, a third bus switch arrangement with a third control input for isolating address lines, the third control input of which is connected to an isolated control line from the second group of control lines, and a fourth bus switch arrangement with a fourth control input for isolating data lines, the fourth control input of which is connected to an isolated control line from the second group of control lines.

This has the inevitable result that only when the plug-in contacts of the base unit leading to the supply voltage meet the corresponding mating plug-in contacts of the pluggable electrical unit can the pluggable electrical unit be supplied with power and the variable resistor can be brought into the low-resistance state.

Only in the low-resistance state of the variable resistor can the first bus switch arrangement be activated, after a predeterminable time period with an internal supply voltage present has elapsed, and the first group of control lines and the signal lines for the identification of the pluggable electrical unit can be switched through at low resistance by the plug-in contact device to further switching means of the pluggable electrical unit.

Only when the first bus switch arrangement has been successfully activated can the second bus switch arrangement be activated and the second group of control lines can be switched through at low resistance by the plug-in contact device to further switching means of the pluggable electrical unit.

Finally, only when the second bus switch arrangement has been successfully activated can the third and fourth bus switch arrangements be activated and consequently the address lines and the data lines can be switched through at low resistance by the plug-in contact device to further switching means of the pluggable electrical unit.

If the conditions mentioned are not satisfied, the respective bus switch arrangement remains at high resistance and the switching means of the pluggable electrical unit remain disconnected from those of the base unit. Because of this causal interrelationship, every pluggable electrical unit which, though it mechanically fits, is electrically incompatible remains isolated from the signal lines of the base unit. Consequently, disruptions to units already in operation and damage to the unit to be inserted are avoided.

According to a further feature of the invention, it is provided that the control input of the variable resistor is connected via contacts of the plug-in connection to the processing unit of the base unit. This achieves the effect that the power supply of a pluggable electrical unit identified as incompatible for the respective slots can be switched off.

A further advantage of the bus access unit according to the invention is that only the signal lines actually used in the pluggable electrical unit are isolated from those of the base unit. It is possible to dispense with the bus switches for the signal lines which, though routed from slot to slot in the base unit, are unused by the respective pluggable electrical unit. This reduces the complexity for the isolation of control lines, data lines and address lines of the pluggable electrical unit from the base unit.

In addition, by dispensing with unnecessary bus switches, the capacitive loading of the signal lines is reduced. While retaining the drive power, the signal-to-noise ratio for the signal lines is consequently improved. Further details and advantages of the invention are explained in more detail below on the basis of an exemplary embodiment.

DESCRIPTION OF THE DRAWING

The only drawing FIGURE shows an embodiment for the present invention.

DESCRIPTION OF THE PREFERRED EMBODIMENT(S)

The single FIGURE required for this purpose shows a base unit 1 with a signal processing means 12 and a power supply device 11 for feeding the signal processing means 12 and all the connectable pluggable electrical units 2 and also a plurality of contact devices 13, only one of which is represented for the sake of overall clarity.

The signal processing means 12 of the base unit 1 comprises a microcontroller circuit with a plurality of input/output terminals, which can be configured as address terminals, as data terminals and as control terminals. Microcontrollers of this type are known per se. For example, the type 80C517 is equipped with 56 digital input/output terminals, which are grouped together in seven bidirectional 8-bit ports. Each of these 56 port terminals can itself be configured as desired as an input or output terminal. By alternately successive configuration as an input terminal and output terminal, each port terminal can be set as a bidirectional terminal for successive reading and writing. In addition, the microcontroller has control-signal terminals of a predetermined and unalterable logical signal assignment and direction of signal transmission.

Connected to the signal processing means 12 of the base unit 1 are signal lines 31 for identification, one group 32 of control lines, a second group 33 of control lines, address lines 34 and data lines 35, which are connected in the manner of a bus to each contact device 13, which is respectively assigned to a slot for receiving a pluggable electrical unit 2.

In addition, a pluggable electrical unit 2 is represented by way of example in the figure, only with the means necessary for explanation of the invention being shown. The functionality of the pluggable electrical unit 2 is accommodated in the module electronics 22.

The pluggable electrical unit 2 has a mating contact device 23 corresponding to the contact device 13 of the base unit 1.

In addition, the pluggable electrical unit 2 is equipped with a variable resistor 26, which is arranged in the feed line for the power supply of the pluggable electrical unit 2 from the base unit 1. The variable resistor 26 comprises an enhancement-mode n-channel MOSFET 261 (Metal-Oxide-Silicon Field-Effect Transistor), the source-drain path of which is connected into the current path of the feed line and the gate terminal of which is connected via a timing element to a control input 264. The timing element comprises a resistor 263, which is connected between the control input 264 and the gate terminal of the MOSFET 261, and a capacitor 262, which is connected between the gate terminal of the MOSFET 261 and frame potential 24.

The drain terminal of the MOSFET 261 is connected to a contact of the mating contact device 23. The source terminal of the MOSFET 261 is the controlled terminal 265 of the variable resistor 26.

The arrangement of the variable resistor 26 in the pluggable electrical units 2 advantageously allows its performance and its current transfer capability to be adapted to the requirements of the respective pluggable electrical units 2, which are predetermined by the respective module electronics 22.

As long as the control input 264 is voltage-free with respect to frame potential 24, the source-drain path of the MOSFET 261 is at high resistance. As soon as a positive voltage with respect to frame potential 24 is applied to the control input 264, the voltage across the capacitor 262, and consequently the gate-source voltage of the MOSFET 261, slowly increases. As a result, the source-drain path of the MOSFET 261 becomes lower in its resistance and the voltage at the controlled terminal 265 increases in a ramp-shaped manner.

In the simplest embodiment, the control input 264 is connected to the drain terminal of the MOSFET 261. In this case, immediately after the pluggable electrical units 2 have been fully inserted into the base unit 1, a positive voltage is applied to the control input 264 and, as a result, the source-drain path of the MOSFET 261 is controlled to low resistance in a ramp-shaped manner.

In a preferred embodiment, in a way coinciding with the figure, the control input 264 is connected to a separate contact of the mating contact device 23, the corresponding contact of which, of the contact device 13, is connected to the signal processing means 12 of the base unit 1.

As a result, the point in time at which the power supply of the pluggable electrical unit 2 is switched on is advantageously definable independently of the point in time of the insertion. In addition, the power supply of a pluggable electrical unit 2 identified as incompatible for the respective slot can be switched off. As a result, disruptions to units already in operation and damage to the incompatible pluggable electrical unit 2 are avoided.

Furthermore, the pluggable electrical unit 2 is equipped with a total of four bus switch arrangements 281, 282, 283 and 284, which respectively have a control input 2810, 2820, 2830 and 2840 and a plurality of pairs of terminals, not designated any more precisely, the terminals of each pair of terminals being disconnected from each other at high resistance or connected to each other at low resistance in dependence on the logical signal level at the associated control input 2810, 2820, 2830 and 2840.

Bus switches of this type are known per se and commercially available in various configurations. For example, the type QS3384 of the company Integrated Device Technology (IDT) has ten pairs of terminals for connecting and disconnecting signal lines, five pairs of terminals in each case being assigned a common control input. Each pair of terminals is connected to each other by an electronic switch, the resistance of which in the closed state is typically 5 ohms. The electronic switches are designed for bidirectional signal flow.

The first bus switch arrangement 281 is intended for the isolation of a first group of control lines 32', 32" and for the isolation of signal lines 31', 31" for the identification of the pluggable electrical unit 2. Here and below, the single-primed reference numerals 31' and 32' stand for non-isolated lines, which are arranged between a bus switch arrangement 281, 282, 283 and 284 and the mating contact device 23 of the pluggable electrical units 2, and the double-primed reference numerals 31" and 32" stand for isolated lines, which are arranged between a bus switch arrangement 281, 282, 283 and 284 and further switching means of the pluggable electrical units 2.

To be specific, the isolated signal lines 31" for the identification of the pluggable electrical unit 2 are connected between the first bus switch arrangement 281 and a read-only memory 21. The read-only memory 21 has identifiers clearly identifying the pluggable electrical unit 2. In addition, it may be provided that individual configuration data of the pluggable electrical units 2 are stored in the read-only memory 21.

The read-only memory 21 is preferably of the serial type. In a special configuration of the invention, the read-only memory 21 has an I$^2$C interface and the signal lines 31' and 31" for the identification of the pluggable electrical unit 2 are designed as an I$^2$C bus.

The non-isolated control lines 32' of the first group are connected in the plugged state of the pluggable electrical unit 2 via the plug-in connection 13, 23 to the first group of control lines 32 of the base unit 1. The non-isolated signal lines 31' for the identification of the pluggable electrical unit 2 are connected in the plugged state of the pluggable electrical unit 2 via the plug-in connection 13, 23 to the signal lines 31 of the base unit 1.

The first control input 2810 of the first bus switch arrangement 281 is connected via a trigger circuit 27, acting as a voltage monitor, to the controlled terminal 265 of the variable resistor 26.

The second bus switch arrangement 282 is intended for isolating a second group of control lines 33', 33". The non-isolated control lines 33' of the second group are connected in the plugged state of the pluggable electrical unit 2 via the plug-in connection 13, 23 to the second group of control lines 33 of the base unit 1. The isolated control lines 33" of the second group are connected to the module electronics 22. The second control input 2820 of the second bus switch arrangement 282 is connected to one of the isolated control lines 32"-1 of the first group.

The third bus switch arrangement 283 is intended for isolating address lines 34', 34". The non-isolated address lines 34' are connected in the plugged state of the pluggable electrical unit 2 via the plug-in connection 13, 23 to the address lines 34 of the base unit 1. The isolated address lines 34" are connected to the module electronics 22. The third control input 2830 of the third bus switch arrangement 283 is connected to one of the isolated control lines 33"-1 of the second group of control lines 33".

The fourth bus switch arrangement 284 is intended for isolating data lines 35', 35". The non-isolated data lines 35' are connected in the plugged state of the pluggable electrical unit 2 via the plug-in connection 13, 23 to the data lines 35 of the base unit 1. The isolated data lines 35" are connected to the module electronics 22. The fourth control input 2840 of the fourth bus switch arrangement 284 is connected to one of the isolated control lines 33"-2 of the second group of control lines 33".

The number of non-isolated data lines 35' and isolated data lines 35" within the pluggable electrical unit 2 coincides. However, it may be provided that the number of data lines 35 of the base unit 1 is different from the number of data lines 35' and 35" within the pluggable electrical unit 2. For example, 32 data lines 35 may be provided in the base unit 1 for operating a 32-bit-wide data bus, accessed fully by pluggable electrical units 2 which have a 32-bit-wide data bus.

Other pluggable electrical units 2 have only a data bus of a smaller width, for example 8 bits, and accordingly have only eight data lines 35' and 35". The differing data bus width of the pluggable electrical unit 2 is noted in the individual configuration data, which are stored in the read-only memory 21 and can be read out by the signal processing means 12 of the base unit 1, so that the data transmission between the base unit 1 and this pluggable electrical unit 2 takes place on only eight data lines 35, 35' and 36".

For the isolation of a pluggable electrical unit 2 with a reduced data bus width there is a lower actual requirement for isolating means. The arrangement of the fourth bus switch arrangement 284 for isolating data lines 35', 35" within the pluggable electrical unit 2 allows an isolation appropriate for requirements and advantageously brings about a reduction in the individual expenditure for the isolation of data lines 35', 35" within the pluggable electrical unit 2.

In addition, by dispensing with unnecessary bus switches, the capacitive loading of the data lines 35 of the base unit 1 is reduced. While retaining the drive power, consequently the signal-to-noise ratio on the data lines 35 is improved.

The measures and advantages explained on the basis of the example of the data lines 35, 35' and 35" apply analogously to the address lines 34, 34' and 34" and the control lines 32, 32' and 32" and 33, 33' and 33" of the first and second groups.

Finally, the pluggable electrical unit 2 has a switch 25, the terminals of which are connected via the plug-in connection 13, 23 to the signal processing means 12 of the base unit 1. The switching contact of the switch 25 is open in the rest position and closed in the fully inserted state of the pluggable electrical unit 2. The switch 25 is preferably coupled to means for locking the pluggable electrical unit 2 in the base unit 1.

When the pluggable electrical unit 2 is inserted into a slot of the base unit 1, the contacts of the contact device 13 and of the mating contact device 23 are connected. In this case, on condition that on the contact device 13 of the base unit 1 and the mating contact device 23 of the pluggable electrical unit 2 lines of the same name are connected to contacts of the same name, the signal lines 31 for identification, the control lines 32 and 33 of the first and second groups, the address lines 34 and the data lines 35 of the base unit 1 are connected to the corresponding non-isolated signal lines 31' for identification, the non-isolated control lines 32' and 33' of the first and second groups, the non-isolated address lines 34' and the non-isolated data lines 35' of the pluggable electrical unit 2. In addition, the terminals of the switch 25 and the control input 264 of the variable resistor 26 are connected to the signal processing means 12 of the base unit 1, and the frame potential 24 and the variable resistor 26 are connected to the power supply 11.

The switch 25 is open. The variable resistor 26 is in its high-resistance state. The bus switch arrangements 281, 282, 283 and 284 are inactive. Accordingly, the isolated signal lines 31" for identification, the isolated control lines 32" and 33" of the first and second groups, the isolated address lines 34" and the isolated data lines 35" are isolated from the non-isolated signal lines 31' for identification, the non-isolated control lines 32' and 33' of the first and second groups, the non-isolated address lines 34' and the non-isolated data lines 35'.

The locking of the pluggable electrical unit 2 in the base unit I has the effect that the switch 25 is closed. Consequently, the presence of the pluggable electrical unit 2 at the respective slot is indicated to the signal processing means 12 of the base unit 1.

As a consequence of this, the signal processing means 12 of the base unit 1 attempts to commence communication with the pluggable electrical unit 2. For this purpose, firstly a positive potential is connected to the control input 264 of the variable resistor 26. Then, the variable resistor 26 becomes increasingly conductive and goes over in a ramp-shaped manner into its low-resistance state. In the low-resistance state of the variable resistor 26, the module electronics 22 and the bus switch arrangements 281, 282, 283 and 284 are connected to the power supply.

In the case of a pluggable electrical unit 2 which mechanically fits but is electrically incompatible with the base unit 1, the incompatibility of which consists in that the control input 264 of the variable resistor 26 is connected to a contact of the mating contact device 23 other than the one corresponding to the contact device 13 of the base unit 1, the module electronics 22 and the bus switch arrangements 281, 282, 283 and 284 remain disconnected from the power supply such that they are voltage-free. As a result, the incompatible pluggable electrical unit 2 is effectively prevented from being put into operation and disruptions to units already in operation and damage to the unit to be inserted are avoided.

Reaching the nominal voltage at the controlled terminal 265 of the variable resistor 26 is monitored by the trigger circuit 27. As soon as the voltage at the controlled terminal 265 of the variable resistor 26 reaches the minimum admissible value of the nominal voltage, the output level of the trigger circuit 27 changes and the first bus switch arrangement 281 is permanently activated. In this case, the isolated signal lines 31" for identification and the isolated control lines 32" of the first group are connected to the associated non-isolated signal lines 31' for identification and the non-isolated control lines 32' of the first group. A communication channel now exists via the signal lines 31, 31' and 31" between the signal processing means 12 of the base unit 1 and the read-only memory 21 of the pluggable electrical unit 2. If the power consumption of the pluggable electrical unit 2 is inadmissibly high, the minimum admissible value of the nominal voltage is not reached at the controlled terminal 265 of the variable resistor 26. Accordingly, the output level of the trigger circuit 27 remains unchanged and the first bus switch arrangement 281 remains inactive. As a result, the low-resistance connection of the isolated signal lines 31" for identification and the isolated control lines 32" of the first group to the associated non-isolated signal lines 31' for identification and the non-isolated control lines 32' of the first group and all other signal lines is avoided. As a result, the pluggable electrical unit 2 is effectively prevented from being put into operation and disruptions to units already in operation and damage to the unit to be inserted are avoided.

In the next step, the identifiers contained in the read-only memory 21 and clearly identifying the pluggable electrical unit 2 are read out by the signal processing means 12 of the base unit 1.

If the incompatibility of the pluggable electrical unit 2 with respect to the base unit 1 is established from the identifying identifiers, the positive potential to the control input 264 of the variable resistor 26 is switched off. The variable resistor 26 then goes over into its high-resistance state in a ramp-shaped manner and the switching means of the pluggable electrical unit 2 are disconnected from the power supply. The time period of the transition of the variable resistor 26 from its low-resistance state to its high-resistance state is preferably shorter than the time period of the transition from its high-resistance state to its low-resistance state. In this case, the first bus switch arrangement 281 is deactivated and the connection between the isolated signal lines 31" for identification and the isolated control lines 32" of the first group and the associated non-isolated signal lines 31' for identification and the non-isolated control lines 32' of the first group is disconnected. Consequently, all the signal lines of the pluggable electrical unit 2 are isolated from the signal lines of the base unit 1. Disruptions to units already in operation and damage to the unit to be inserted are consequently avoided.

If the compatibility of the pluggable electrical unit 2 with respect to the base unit 1 is established from the identifying identifiers, the individual configuration data of the pluggable electrical unit 2 are read out from the read-only memory 21 and settings taking these data into consideration are performed in the base unit 1. Subsequently, the second bus switch arrangement 282 is permanently activated via a control line 32"-1 of the first group. In this case, the isolated control lines 33" of the second group are connected to the associated non-isolated control lines 33' of the second group.

For communication between the signal processing means 12 of the base unit 1 and the module electronics 22 of the pluggable electrical unit 2, the third and fourth bus switch arrangements 283 and 284 are activated as need be via control lines 33"-1 and 33"-2 of the second group of control lines 33". In this case, the isolated address lines 34" are connected as need be via the third bus switch arrangement 283 to the non-isolated address lines 34' and consequently address signals are switched through from the signal processing means 12 of the base unit 1 to the module electronics 22 of the pluggable electrical unit 2.

The isolated data lines 34" are connected as need be via the fourth bus switch arrangement 284 to the non-isolated data lines 34' and consequently the data transmission path is switched through between the signal processing means 12 of the base unit 1 and the module electronics 22 of the pluggable electrical unit 2.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An electrical unit for plug-in connection to a base unit, said plug-in electrical unit comprising:
   non-isolated first and second control lines, signal lines, data lines, and address lines;
   first control lines and signal lines all isolated from an associated one of said non-isolated first control lines and said non-isolated signal lines when a first switching means connected between said isolated first control and signals lines and said non-isolated first control and signal lines is in an open condition;
   second control lines all isolated from an associated one of said non-isolated second control lines when a second switching means connected between said isolated and said non-isolated second control lines is in an open condition;
   address lines all isolated from an associated one of said non-isolated address lines when a third switching means connected between said isolated and non-isolated address lines is in an open condition; and
   data lines all isolated from an associated one of said non-isolated data lines when a fourth switching means connected between said isolated and said non-isolated data lines is in an open condition;
   said first switching means changing to a closed condition only when a power supply voltage in said plug-in electrical unit reaches a predetermined amplitude;
   said second switching means changing to a closed condition only when said non-isolated and said isolated first control lines are connected to each other and said plug-in electrical unit is plugged in to said base unit and identified as compatible with said base unit; and
   said third switching means and said fourth switching means both changing to a closed condition as needed under control of an associated one of said second control lines only when said non-isolated and said isolated second control lines are connected to each other.

2. The plug-in electrical unit of claim 1 further comprising a power supply having a feed line and a variable resistor arranged in said feed line.

3. The plug-in electrical unit of claim 1 further comprising a memory having therein an identifier of said plug-in electrical unit.

4. The plug-in electrical unit of claim 3 wherein said memory is connected to said isolated signal lines.

5. The plug-in electrical unit of claim 1 further comprising a switch which is usually open and closes when said plug-in unit is locked in said base unit.

6. The plug-in electrical unit of claim 5 wherein said base unit has processing means to determine when said plug-in electrical, unit is locked in said base unit and said closing of said switch on said plug-in unit indicates to said processing means that said plug-in unit is present in said base unit.

7. A combination comprising:
   a base unit; and
   an electrical unit for plug-in connection to said base unit, said plug-in electrical unit comprising:
   non-isolated first and second control lines, signal lines, data lines, and address lines;
   first control lines and signal lines all isolated from an associated one of said non-isolated first control lines and said non-isolated signal lines when a first switching means connected between said isolated first control and signals lines and said non-isolated first control and signal lines is in an open condition;
   second control lines all isolated from an associated one of said non-isolated second control lines when a second switching means connected between said isolated and said non-isolated second control lines is in an open condition;
   address lines all isolated from an associated one of said non-isolated address lines when a third switching means connected between said isolated and non-isolated address lines is in an open condition; and
   data lines all isolated from an associated one of said non-isolated data lines when a fourth switching means connected between said isolated and said non-isolated data lines is in an open condition;
   said first switching means changing to a closed condition only when a power supply voltage in said plug-in electrical unit reaches a predetermined amplitude;
   said second switching means changing to a closed condition only when said non-isolated and said isolated first control lines are connected to each other arid said plug-in electrical unit is plugged in to said base unit and identified as compatible with said base unit; and
   said third switching means and said fourth switching means both changing to a closed condition as needed under control of an associated one of said second control lines only when said non-isolated and said isolated second control lines are connected to each other.

8. The combination of claim 7 wherein said base unit comprises:
   signal lines connected to said non-isolated signal lines of said plug-in electrical unit when said plug-in electrical unit is connected to said base unit;
   first control lines connected to said non-isolated first control lines of said plug-in electrical unit when said plug-in electrical unit is connected to said base unit; and
   second control lines connected to said non-isolated second control lines of said plug-in electrical unit when said plug-in electrical unit is connected to said base unit.

9. The combination of claim 8 wherein said plug-in electrical unit further comprises a memory having therein an identifier of said plug-in electrical unit, said memory connected to said isolated signal lines of said plug-in electrical unit.

10. The combination of claim 9 wherein said base unit further comprises signal processing means connected to said base unit signal lines for identifying from said identifier in said plug-in electrical unit memory a plug-in electrical unit connected to said base unit.

11. The combination of claim 10 wherein said plug-in electrical unit further comprises a switch which is usually open and closes when said plug-in electrical unit is locked in said base unit, said switch connected to said base unit signal processing means when said plug-in electrical unit is locked in said base unit.

12. The combination of claim 7 wherein said plug-in electrical unit further comprises a variable resistor and said base unit further comprises a power supply which is connected to said variable resistor when said plug-in electrical unit is plugged into said base unit and is electrical compatible with said base unit.

13. The combination of claim 12 wherein said plug-in electrical unit further comprises a switch which is usually open and closes when said plug-in electrical unit is locked in said base unit, said switch connected to a base unit signal processing means when said plug-in electrical unit is locked in said base unit and said base unit power supply providing when said plug-in unit is locked in said base unit a potential that causes said plug-in unit variable resistor to change from a high resistance state to a low resistance state.

14. The combination of claim 13 wherein said changing of said variable resistor from a high resistance state to a low resistance state allows said first, second, third and fourth switching means to be connected to said base unit power supply.

15. The combination of claim 7 wherein said plug-in electrical unit further comprises a variable resistor and said base unit further comprises a power supply which is not connected to said variable resistor when said plug-in electrical unit is plugged into said base unit and is not electrically compatible with said base unit.

16. The combination of claim 7 wherein said plug-in electrical unit further comprises a memory having therein an identifier of said plug-in electrical unit, said memory connected to said isolated signal lines of said plug-in electrical unit and said base unit further comprises signal processing means connected to said base unit signal lines for identifying from said identifier in said plug-in electrical unit memory a plug-in electrical unit connected to said base unit.

17. The combination of claim 16 wherein said plug-in electrical unit further comprises a variable resistor and a switch which is usually open and closes when said plug-in electrical unit is locked in said base unit and said base unit further comprises a power supply which is connected to said variable resistor when said plug-in electrical unit is plugged into said base unit and is electrically compatible with said base unit, said switch connected to a base unit signal processing means when said plug-in electrical unit is locked in said base unit and said base unit power supply providing when said plug-in unit is locked in said base unit a potential that causes said plug-in unit variable resistor to change from a high resistance state to a low resistance state to provide power to each of said first, second, third and fourth switching means.

18. The combination of claim 17 wherein said base unit power supply removes said potential from said variable resistor when said base unit signal processing means identifies from said identifier in said plug-in electrical unit memory that said plug-in electrical unit is incompatible with said base unit.

\* \* \* \* \*